May 17, 1927. 1,629,257
H. COLOMB
PROCESS OF MANUFACTURING BLANK MOVEMENTS OF WATCHES
Filed Aug. 11, 1924
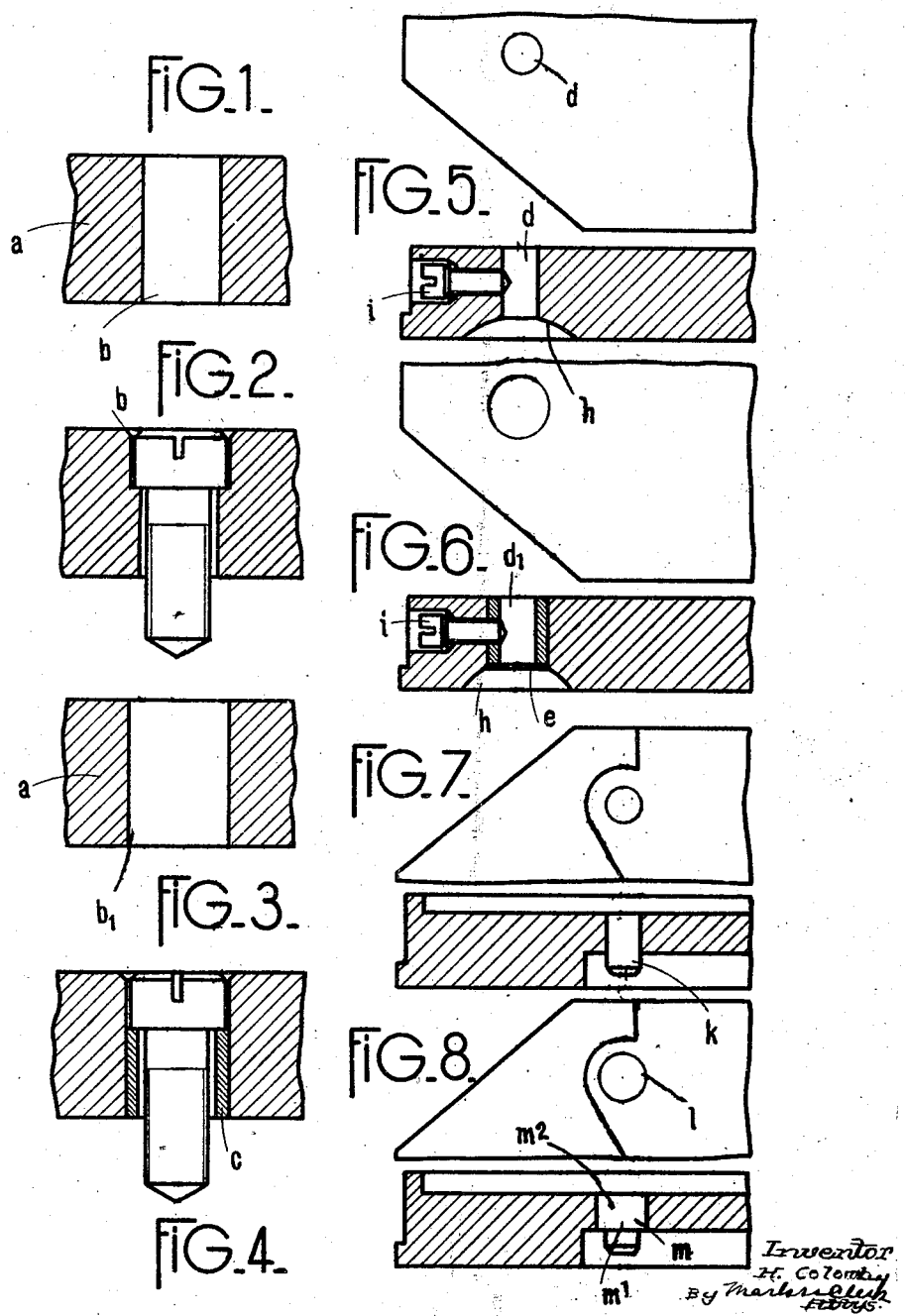

Patented May 17, 1927.

1,629,257

UNITED STATES PATENT OFFICE.

HENRI COLOMB, OF TAVANNES, SWITZERLAND.

PROCESS OF MANUFACTURING BLANK MOVEMENTS OF WATCHES.

Application filed August 11, 1924, Serial No. 731,536, and in Switzerland February 1, 1924.

Heretofore the diameter of the holes employed as working holes in the manufacturing of watch movement blanks did not exceed that of the ordinary holes for axle holes, fixing screws and the like because said working holes were afterwards also used as holes which had to receive parts of the watch mechanism. For certain new methods of manufacturing however such size of working pins has proved to be too weak and therefore it has become desirable to provide stronger pins and larger working holes, but without altering anything in the usual size of parts.

The present invention relates to a method allowing the use of larger working holes without changing anything in the usual size of parts and consists in providing bushings in said holes which bushings are adapted to the proper size of the respective parts of watch mechanism.

In the annexed drawing some examples are shown of working holes arranged according to the present invention.

Figs. 1 and 2 are vertical sections showing the arrangement hitherto employed for adapting working holes to holes of a fixing screw of a bridge.

Figs. 3 and 4 are like views illustrating the method according to the present invention.

Fig. 5 is a plan view and a vertical section of the hole of a dial foot used as hole of a pin working after the method hitherto known and Fig. 6 is a plan view and a vertical section of the hole of a working pin arranged according to the present invention so as to serve also as hole of a dial foot.

Figs. 7 and 8 are a set of figures illustrating in the same manner the old and the new arrangement of the hole of a working pin to be used as a hole for the pivot of a rocking bar.

Referring to the Figures 1 to 4 $b$ is the hole of the fixing screw of a bridge used as a working hole and having a diameter corresponding to the diameter of the stem of the fixing screw. This hole is recessed afterwards so that the screw head may be sunk into the bridge. After the method of the present invention and quite maintaining the same size of screw the diameter of the screw head is chosen as diameter of the working pin and accordingly the hole is punched to suit this size. This is the hole $b^1$ shown in Fig. 3. In order to prepare this hole for receiving the fixing screw a bushing $c$ is pressed into the hole leaving a recess for the screw head as shown in Fig. 4.

With reference to the Figures 5 and 6 the hole $d$ intended for a dial foot which is fixed by set screw $i$ was used heretofore as hole for a working pin having the same diameter. According to the present invention the hole is punched or drilled for a larger size of working pin as shown in $e$ in Fig. 8 and a bushing $d^1$ fitting the dial foot is pressed in afterwards.

In the Figures 7 and 8, $k$ represents a pivot of a rocking bar. Heretofore to the hole was given the same diameter as to the pivot and accordingly also the working pin had the same diameter. According to the present method the hole is punched for a working pin of any suitable and larger diameter as shown in $l$ in Fig. 8 and in order to utilize this hole for a pivot pin $m$ this pivot pin having a diameter $m^1$ is provided with a shouldered base $m^2$ which is pressed into the working hole $l$.

What I claim is:

1. The herein described process of preparing a part of the frame of a watch movement which comprises the following steps: forming a working hole in said part of a diameter larger than that of the working portion of the fastening member designed to be ultimately placed therein; using said hole as a work hole for adjusting said part in position in machines to the operation of which it is subsequently subjected and, finally, forcing a bushing into said hole having an internal diameter approximately that of the above mentioned fastening member.

2. A process such as defined in claim 1 in which said bushing is forced far enough into said hole to leave a free space above it for countersinking said fastening member.

3. The herein described process of preparing and assembling parts of a watch movement one of which has sections of differing diameters, which process comprises the following steps: forming a working hole in one of said parts of a diameter such that the portion of the other part having the greater diameter will fit into it; using said hole as a work hole for adjusting said first mentioned part in position in a machine to the operation of which it is subsequently subjected, and, finally, fixing said second part in said hole with its portion of smaller diameter projecting therefrom.

In testimony whereof I affix my signature.

HENRI COLOMB.